Sept. 16, 1924.
W. L. JORDAN
1,508,397
HAIR CLIPPERS
Filed Oct. 16, 1923
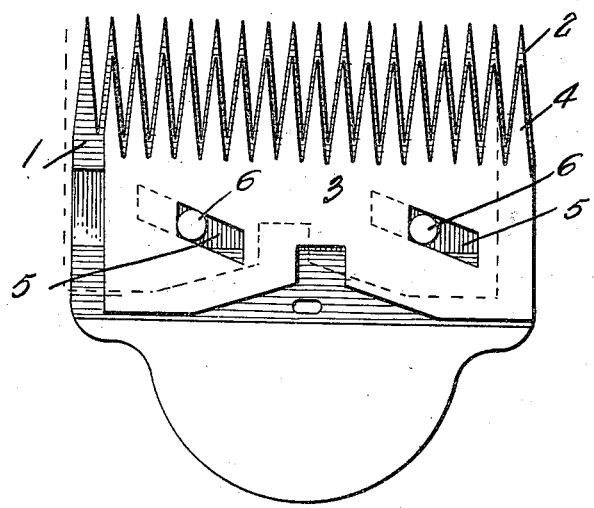
W. L. Jordan, Inventor.
By
Attorneys Patented Sept. 16, 1924.

REISSUED AS NO. 16000 FEB. 10 1925

1,508,397

UNITED STATES PATENT OFFICE.

WINFIELD LINCOLN JORDAN, OF CHICAGO, ILLINOIS.

HAIR CLIPPERS.

Application filed October 16, 1923. Serial No. 668,883.

*To all whom it may concern:*

Be it known that I, WINFIELD LINCOLN JORDAN, a citizen of the United States, residing at Chicago, in the county of Cook and State of Illinois, have invented new and useful Hair Clippers, of which the following is a specification.

This invention relates to hair clippers and the object thereof is to provide a clipper of this character the blades of which are so constructed and mounted as to effect a drawcut or saw movement of the cutting teeth of uniform speed throughout said movement and through the entire stroke of the movable blade.

Another object is to so construct such a device that a continuous draw movement is produced.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

The accompanying drawing represents a plan view of a portion of a hair clipper showing the cutting blades constructed and mounted in accordance with this invention.

In the form shown the lower cutting blade 1 of a hair clipper is illustrated having the usual saw teeth 2 and on which is superposed the upper cutting blade 3 having the teeth 4 to cooperate with teeth 2 of blade 1. The upper blade 3 is provided with a pair of diagonally disposed slots or grooves 5 through which project studs or pins 6 carried by the lower blade 1 or vice versa so that when the clipper is actuated in the usual manner by the means not shown a continuous drawcut or saw movement of the cutting teeth is produced to the extreme limit of the stroke in both directions, the cutting action being smooth and even throughout the entire stroke both ways.

From the above description it will be obvious that the straight diagonal slots of blade 3 effect a continuous draw or saw movement of the cutting teeth of uniform speed throughout the movement at no time making a straight cut as the plate or blade 3 always move diagonally when in action.

Various changes in the form, shape, proportion and other minor details of construction may be made without departing from the principle or sacrificing any of the advantages of the claimed invention.

I claim:—

1. In a clipper of the class described superposed blades having cooperating saw teeth, one of said blades having diagonally disposed slots and the other studs extending into said slots whereby on the reciprocation of the movable blade a continuous straight draw cut of the teeth will be effected throughout the entire stroke of the blade.

2. In a clipper of the class described cutting blade mounted one on the other and having cooperating saw teeth, said blade having cooperating means to effect a continuous straight draw cut or saw movement of the cutting teeth throughout the entire stroke of the blade.

3. In a clipper of the class described a lower cutting plate and an upper cutting plate, said upper cutting plate having diagonally disposed slots and the lower plate having studs extending into said slots to produce a continuous draw movement of uniform speed of the cutting elements throughout the entire stroke of the blade.

4. In a clipper of the class described cutting blades mounted one on the other and having cooperating teeth, said blades having means to effect a continuous draw cut or saw movement of the teeth throughout the entire stroke of the blade in both directions.

In testimony that I claim the foregoing as my own, I have hereto affixed my signature in the presence of two witnesses.

WINFIELD LINCOLN JORDAN.

Witnesses:
J. E. MIEDING,
GEO. F. KELLY.